United States Patent [19]

Webb

[11] Patent Number: 5,263,794

[45] Date of Patent: Nov. 23, 1993

[54] ENVIRONMENTALLY SAFE UNDERGROUND PIPING SYSTEM

[75] Inventor: Michael C. Webb, Chester Springs, Pa.

[73] Assignee: Environ Products, Inc., Lionville, Pa.

[21] Appl. No.: 838,615

[22] Filed: Feb. 19, 1992

[51] Int. Cl.[5] .............................................. F16L 1/00
[52] U.S. Cl. ..................................... 405/52; 405/154; 588/249
[58] Field of Search .................... 405/52, 53, 128, 129, 405/258, 154; 138/114, 104; 73/49.1; 588/249

[56] References Cited

U.S. PATENT DOCUMENTS

| | | | |
|---|---|---|---|
| 4,659,251 | 4/1987 | Petter et al. | 405/52 |
| 4,932,257 | 6/1990 | Webb . | |
| 4,958,957 | 9/1990 | Berg et al. | 405/52 X |
| 4,968,179 | 11/1990 | Frahm | 405/128 X |
| 4,971,477 | 11/1990 | Webb et al. . | |
| 5,030,033 | 7/1991 | Heintzelman et al. | 405/53 X |
| 5,098,221 | 3/1992 | Osborne | 405/52 |

Primary Examiner—Dennis L. Taylor
Attorney, Agent, or Firm—Eugene E. Renz, Jr.

[57] ABSTRACT

An environmentally safe underground piping system which employes a inner flexible fluid supply piping system contained within an outer non-flexible containment piping system which interconnects a series of surface access chambers. Both the flexible supply and and non-flexible containment piping systems are interconnected by a series of directional fittings and couplings. The containment system may be installed, integrity tested, inspected and backfilled, prior to installation of the supply piping system which allows for a faster and more economical installation.

25 Claims, 9 Drawing Sheets

ENVIRONMENTALLY SAFE UNDERGROUND PIPING SYSTEM

FIELD OF THE INVENTION

The present invention relates to an environmentally safe underground piping system which is secondarily contained to prevent hazardous fluids from escaping into the surrounding environment.

BACKGROUND OF THE INVENTION

In recent years there has been an increased awareness that the underground storage and distribution systems of hazardous fluids, such as, hydrocarbon fuels and a deverisity of chemicals, need to be improved to prevent any leaking product from these systems from escaping into the environment and potentially contaminating the underground drinking water. Both public health and fire safety regulatory bodies have imposed strict guidelines and regulations on such systems to insure public safety.

Leaking underground storage tanks and their associated underground piping systems became the focus of the Federal Environmental Protection Agency (EPA) to initiate federal and state legislation that would require an improved means of strorage, distribution, leak detection and accounting of all stored fluids which are deemed to be hazardous. The EPA conducted studies which showed that underground piping failures were caused by poor installation practices, corrosion and structural failure were responsible for most of the leaks reported.

In response to this public awareness and concern, equipment specifiers and manufacturers have developed improved piping systems in recent years to provide a greater degree of protection for the environment. Most of these improved piping systems provide a second barrier of protection around the primary fluid supply piping, commonly referred to as "secondary containment".

In addition to the regulatory bodies mentioned above, facility owners and their insurance companies have become very concerned with the type of materials used and the design specifications of existing, new and proposed fuel storage, transmission and dispensing equipment. An important area of concern is the chemical compatibilty of the materials used in the construction of both the primary and secondary containment systems. As a result, Underwriters Laboritodes Inc. (UL), a nationally recognized and accepted independent testing laboritory, has already established and proposed new standards for both the primary and secondary containment undeground storage, transmission and dispensing equipment. Acceptable materials for use in this application generally relate to the materials stability when exposed to conditions and chemicals found naturally in a subterranean environment and the exposure to the fuels and their chemical additives, as well as other chemicals being stored and dispensed. In addition, another area of concern is ability of a material to provide an acceptable containment barrier for the product to be stored. The product permeability rating of a material is generally accepted by reguaLtors and UL as being more stringent for the primary storage vessel than the secondary containment vessel, which only provides a means of temporary storage of leaking product until detected and corrected.

For example, UL has established and proposed new standards which include acceptable permeability levels for the primary containment and secondary containment storage and dispensing systems. These standards require that a typical primary wall section should not be able to permeate more than 1% of its stored product weight over a period of 270 days, whereas, a typical seconary containment wall section should not be able to permeate more than 1% of its stored product over a period of 30 days. Keeping these standards in mind, UL listed products for storage of hazardous liquids and fuels must be constructed of the proper materials at the acceptable thickness to provide a satisfactory level of environmental protection and fire safety.

For purpose of this description, "underground piping systems" is defined as the means of transferring hazardous liquids from a buried underground storage "tank", by the tank's electrically powered dispensing "pump" to a generally metered dispensing unit or "dispenser", generally located above ground. An underground piping system which is secondarily contained by a larger diameter piping system is generally referred to as a "double-wall piping system". The primary distribution pipe which is contained is commonly referred to as the "supply pipe" and the larger outer secondary containment pipe is commonly referred to as the "containment pipe". Other secondary containment components, such as, surface access chambers, which are installed around the tank's pump and underneath a dispenser, are commonly refered to as "access sumps". These storage, transfering and dispensing sytems, are typically found at service stations which market gasoline and diesel fuel.

Equipment manufacturers have in recent years introduced both patented and non-patented supply piping systems and/or secondary containment systems for these supply piping systems of various designs and material selections. The following double wall piping systems which are considered to be prior art of this invention, are disclosed as follows:

(1) A secondarily contained underground piping system which features a non-flexible fiberglass supply pipe system fully contained by a larger non-flexible fiberglass containment piping system. One such system also includes the feature of telescoping containment pipe, whereby two non-flexible containment pipes are offered, one with a slightly larger inside diameter than the outside diameter than the other. This permits larger pipe to be installed over the smaller pipe therefore exposing more of the supply pipe contained within both. The containment pipe and fittings are of a larger inside diameter than the outside diameter of the supply pipe and fittings contained within. The short bend radius containment fittings and couplings are of a clamshell design (two piece) to permit assembly of the the short bend radius supply fittings prior to assembly of the containment piping system. Both the supply and containment piping components are joined together by heat activated resins to insure a liquid tight joint. These systems are generally dimicult to install due to the nature of their design and joining system. Both the supply and containment piping system are made of fiberglass which provides excellent chemical compatibility and impermeability.

(2) A secondarily contained underground piping system which features a non-flexible fiberglass or steel supply pipe fully contained by a combination of both a larger flexible and non-flexible polyethylene telescoping containment pipe. The telescoping containment pipe design that permits the complete inspection of the supply pipe line during assembly and integrity testing. This containment piping system includes a flexible containment pipe which is sufficiently flexible to go around and contain short bend radius supply elbow fittings. An oversized short bend radius containment tee fitting is provided for insertion, assembly and inspection of the smaller short bend radius supply tee fittings before the containment system is assembled. The containment components of this system are joined by means of metal fasteners and flexible seals. The flexible polethylene containment pipe is not of sufficient wall thickness and density to offer the level of impermeability necessary to meet the UL standard. The non-flexible polyethlene containment pipe is of sufficient wall thickness and density to meet the UL standard. Both the contained fiberglass or steel supply pipe will meet the UL standard. Note: The metal fastener use to make a compression will not meet the UL standard for corrosion resistance.

(3) A secondarily contained underground piping system which features a non-flexible fiberglass or steel supply pipe fully contained by a larger non-flexible polyethylene telescoping containment pipe. The telescoping containment pipe design permits the complete inspection of the supply pipe line during assembly and integrity testing. This containment piping system includes short bend radius clamshell (split) containment fittings that permits assembly and inspection of the smaller short bend radius supply fittings before the clamshell containment are assembled over them. The containment components of these systems are generally joined by means of metal fasteners and flexible seals. Both the non-flexible polyethylene containment pipe and contained fiberglass or steel pipe will meet the UL standard.

(4) A secondarily contained underground piping system which features a fiberglass or steel non-flexible supply pipe partially contained by a flexible membrane piping trench liner. This type of secondary containment system provides a single containment system for a multitude of supply pipe lines contained within. These piping trench lining systems are generally custom fabricated at the jobsite and are typically joined by mechanical means using metal fasteners and flexible seals. These piping containment systems are often difficult to install, damage prone, directionally limiting and do not provide a full measure of secondary containment. The material composition of these liners do not offer sufficient wall thickness or density to meet the UL standards. Note: The metal fastener use to make a compression will not meet the UL standard for corrosion resistance.

(5) A secondarily contained underground piping system which features a fiberglass or steel non-flexible supply pipe partially contained by a non-flexible fiberglass trench liner. This type of secondary containment system provides a single containment system for a multitude of supply pipe lines contained within. These piping trench lining systems are generally factory fabricated and shipped in large sections for assembly at the jobsite and are joined by heat activated resins in combination with glass fiber reinforcement. The material composition of these liners is sufficient to meet the UL standards.

(6) A secondarily contained underground piping system which features a flexible nylon composite supply pipe fully contained by a larger flexible polyethylene containment pipe. The flexible supply pipe has internal corrugations for added flexiblity and requires metallic couplings installed on each end of a pipe section for attachment to a metallic short bend radius tee or elbow supply fitting. The flexible containment pipe is a thin wall corrugated tube which provides added flexiblity and structural strength. This type of secondarily contained piping system requires the use of access sumps which are interconnected by continous runs of both flexible supply and containment pipe sections. These access sumps provide a means of containment for the metallic supply couplings and fittings as well as the containment pipe connections. Both the supply and containment components are joined by mechcanical means using rubber gaskets and washers for seals. The material composition of the flexible supply pipe will not the UL standard for primary containment of alcohol and alcohol blended fuels. The material composition of the the flexible containment pipe is not of sufficient thickness or density to meet the UL standards for secondary containment.

(7) A secondarily contained underground piping system which features a flexible rubber composite supply pipe fully contained by a larger flexible polyurethane composite containment pipe. The flexible supply pipe is made a rubber elastomeric material for flexiblity and requires metallic couplings installed on each end of a pipe section for attachment to a metatic short bend radius tee or elbow supply fitting. The flexible containment pipe is a thick wall tube which provides structural strength but limited flexiblility This type of secondarily contained piping system requires the use of access sumps which are interconnected by continuous runs of both flexible supply and containment pipe sections. These access sumps provide a means of containment for the metallic supply couplings and vahous adapters. Both the supply and containment components are joined by mechanical means using rubber gaskets and washers for seals. The material composition of the flexible supply pipe will not meet the UL standard for primary containment.

In addition to the secondarily contained underground piping systems, described above, a number of fiberglass and steel tank manufactures, as well as piping and specialty containment manufacturers have introduced access sumps to the market. These access sumps originated from a product called a backfill retainer which was simply a round cylinder, open at the top and bottom, which was installed around the tank's pump and under the street access manhole to keep the backfill materials away from the pump and various plumbing connections. Often a short section of corrugated metallic culvert was used for this purpose. In the early 1980's, fibeglass tank manufacturers began to offer an improved backfill retainer, called a riser and riser extention which connected to the tank and was made made of non-corrodable fiberglass material. Steel tank manufactures soon followed with there own version of a riser made of coated steel. When the industry became aware that underground tanks and piping needed to be secondarily contained, they also turned their attention to the tank's pump and miscellaneous plumbing connections. Soon thereafter, pump access chambers appeared on the market as a means of secondarily containing the tank's pump and associated plumbing connections. With the introduction of these watertight chambers it was quickly recognized that they could also be used as a fluid collection and detection sump for the attached secondarily contained piping systems described above.

Because these chambers were located at the low end of a sloped secondarily contained piping line, they were logical choice for the collection point for any leaking product which was contained inside the containment pipe. From this point on they were considered to be a multi-purpose chamber and were commonly refered to as pump access sumps.

As the full scope of secondary containment requirements began to unfold, attention was turned to the causes of product leaks from within and under the above ground dispenser such as leaking plumbing joints and spillage from required fuel filter changes. The solution seemed to be a shallow collection sump installed directly under the dispenser. The first dispenser collection sumps were shallow and were commonly referred to as dispenser pans. Soon thereafter it was recognized that a deeper dispenser pan was required to contain the entire metallic flexible connector which was installed directly under the dispenser. These deeper dispenser pans became commonly known dispenser access sumps. These dispenser sumps were not developed as an extention of the secondarily contained piping systems but rather were adapted to accomodate these piping systems.

Manufacturers of these access sumps began to offer a means of attaching and sealing various pipe and conduit entries into these access sumps. One approach was to preinstall cuffed openings at various locations in the side wall of the access sump. Manufactures of fiberglass access sumps lamisted in fiberglass couplings into the side wall of the access sump for attachment of fiberglass pipe by means of fiberglass lamination or by means of a common rubber reducer seal used in the plumbing industry. Manufacturers of steel access sumps provided welded on coupings which served a similar purpose. Later, as molded polyethlene access sumps began to be introduced to the market, a variety of pipe entry seals were employed to accomodate all the available types of piping systems. Listed in order of their introduction are descriptions of these pipe and conduit sealing means. (a) A plastic molded cuff which was installed over an opening in the side wall which was attaced by means of plastic welding in the field. This plastic cuff, was similar in design and purpose to those provided with the fiberglass and steel access sumps for sealing pipe entries. (b) A conventional plastic bulkhead fitting was used for conduit entries. (c) A commercially available rubber grommet was offered to replace the plastic cuffs and bulkhead fittings for sealing both pipe and conduit entries. The rubber grommet was installed into an opening in the side wall of the access sump. (d) A rubber flanged boot was offered as a solution to the leaking rubber grommets. This rubber boot is inserted inside an opening in the side wall of the access sump and mechanically attached to the side wall by means of bolt fasteners. The significant advantage of this type of sealing device was that it provided a watertight seal for both conduit and pipe entries that could be installed in any desired location in the side wall of the access sump. These various sealing devices evolved over time to accommodate most of the secondably contained piping systems described above. Only two types of conduit sealing means were deveoped for a specific application which are deschbed as follows: (a) A plastic internal facing cuff was molded in at specific locations into the side wall of the polyethylene access sumps to seal flexible corrugated polyethylene containment pipe entries. These sumps were a required component of a secondarily contained underground piping system which features a flexible nylon composite supply pipe fully contained by a larger flexible polyethylene containment pipe. (b) A plastic external facing cuff was intrigally molded at specific locations into the side wall of the polyethylene access sumps to seal thick walled smooth flexible containment pipe entries. These sumps were required components of a secondarily contained underground piping system which features a flexible rubber composite supply pipe fully contained by a larger flexible polyurethane composite containment pipe.

The introduction of continous flexible supply pipe, a number of years ago, was a means of reducing the amount of connection joints in the supply pipe compared to the commonly used steel and fiberglass non-flexible supply piping systems. The first flexible supply pipe which was introduced was a non-contained thin walled flexible copper tubing which was directionally bent to accommodate the routing required to connect the tank's pump to the various dispenser. The second flexible supply piping system was introduced in Europe, which was a direct burial or non-contained flexible polyethylene tubing which had thick wall and offered only a limited amount of flexibilty. Both of these flexible supply piping systems did not require the use of access sumps. The third flexible supply piping was introduced several years ago and was secondarily contained inside a flexible containment pipe and did require the use of access sumps. Two versions of this type flexible piping system were introduced approximately at the same time and are briefly described above.

Some notable advantages of these flexible double wall piping systems include considerably fewer piping joints than conventional double wall piping systems and also provide the unique feature of removing the supply pipe, in the event of a problem, without the need for excavation. These systems feature continonus lengths of both flexible supply pipe and flexible containment pipe which are made available in rolls of very long lengths. From these long lengths, pipe sections may be custom cut to length for installation between two or more surface access sumps. This feature eliminates the need for any directional fittings in the flexible containment pipe line, thus eliminating the need of any piping joints between the interconnected access sumps. The flexible phmary piping does require the use of directional fittings but these fittings are located within the surface access sumps where they are surface accessible for inspection and maintenance. This piping design permits complete access to and observation of all the primary and secondary piping joints from the ground surface without the need for excavation.

Some notable disadvantages of both of these flexible double wall piping systems are as follows: (a) Thin walled corrugated flexible containment pipe is easy to damage and difficult to repair. The inner corrugations restrict fluid migration from the source of the leak to the collection sump. The thin polyethylene material will not meet the UL standard for secondary containment. (b) Thick walled non-corrugated flexible containment pipe requires the use of a soft elastomeric material in order to achieve limited flexiblity. It is questionable as to whether or not this material will meet the UL standard for secondary containment. (c) Inner corrugated flexible supply pipe provides good flexibility but poor hydraulic flow efficiency and a low maximum operating pressure. The internal corrugations cause to pipe to be pressure expandable, which can produce faulty readings for in-line leak detection devices and make it difficult to connect internally expanded coupling devices, which could result in a leak. (d) Thick walled flexible rubber supply pipe is heavy and has a highly resistive outer surface which makes it difficult to install into the flexible containment pipe. Rubber material is an unsatisfactory material to use as a supply pipe and will not likely meet the UL standard for primary containment.

All of the secondarily contained piping systems and access sumps discussed above have developed over a relatively short period of time in response to the continously changing environmnetal and safety regulations. The design criteria used by vahous manufacturers for the developement of their products was dependent on what they considered to be important and what they felt they had the capabilty to produce. As a result none of the assembled systems described above is the absolute solution to a secondarily contained underground piping system. Certain component parts and design concepts of these discussed containment systems provide only partial solutions in developing an ideal piping containment system which meets the most important design criteria.

SUMMARY OF THE INVENTION

It is the objective of the present invention to provide an environmentally safe piping system which improves on the design, material selection, installation and cost deficiencies of those underground piping systems described above and others which exist, but not mentioned, in this text. This piping system is used for conveying hazardous liquids from an underground storage tank to an above ground liquid dispensing unit typically found at service stations.

The present invention provides a secondarily contained underground piping system which features a flexible nylon supply pipe fully contained by a larger non-flexible fiberglass containment pipe. The flexible supply has a smooth outer and inner wall and requires metatic couplings installed on each end of a pipe section for attachment to a metallic short bend radius tee or elbow supply fitting. The non-flexible containment pipe has a smooth outer and inner wall and has excellent structural strength. This type of secondably contained piping system requires the use of access sumps which are interconnected by continous runs of flexible supply pipe and non-continous runs of non-flexible containment pipe. These access sumps provide a means of containment for the metalic supply couplings and fittings as well as the containment pipe connections.

The piping system interconnects with liquid-tight access chamber, which have been commercially available for years. These access chambers are typically installed around the undergroud storage tank's pump and underneath above ground liquid dispensing units. These access chambers serve as a means of access to a tanks submersible pump and associated plumbing connections as well as access to a dispensers plumbing and safety valves and flexible connectors. In addition these access chambers provide a means of secondary containment for the contained plumbing components and may serve as a product collection well which is required for many leak detection systems to signal an alarm. They may also serve as a final or intermediate product collection well for double wall piping systems which may enter or pass through the chamber.

The invention employs the use of an improved supply pipe which is made of flexible material which has a permeabilty rating which is acceptable to meet U.L. standards for primary containment systems which store flamable liquids. In addition, this flexible supply pipe has a smooth inner and outer surface for improved hydraulic flow, coupling capabilities and ease of installation. The invention also employs the use an improved containment pipe which is made of a non-flexible material which has a permeabilty rating which is acceptable to meet U.L. standards for secondary containment systems which store flamable liquids. In addition, this non-flexible containment pipe has a smooth inner surface for unrestricted fluid migration and unrestricted flexible supply pipe installation. Both the flexible primary piping system and nonflexible secondary containment system are installed together with other associated components, in such a manner that the result is completely environmentally safe undergound piping system.

The following drawings, drawing descriptions and claims will further explain how the invention is interconnected, installed, inspected, tested and continously monitored.

DESCRIPTION OF THE INVENTION

Figure 1:
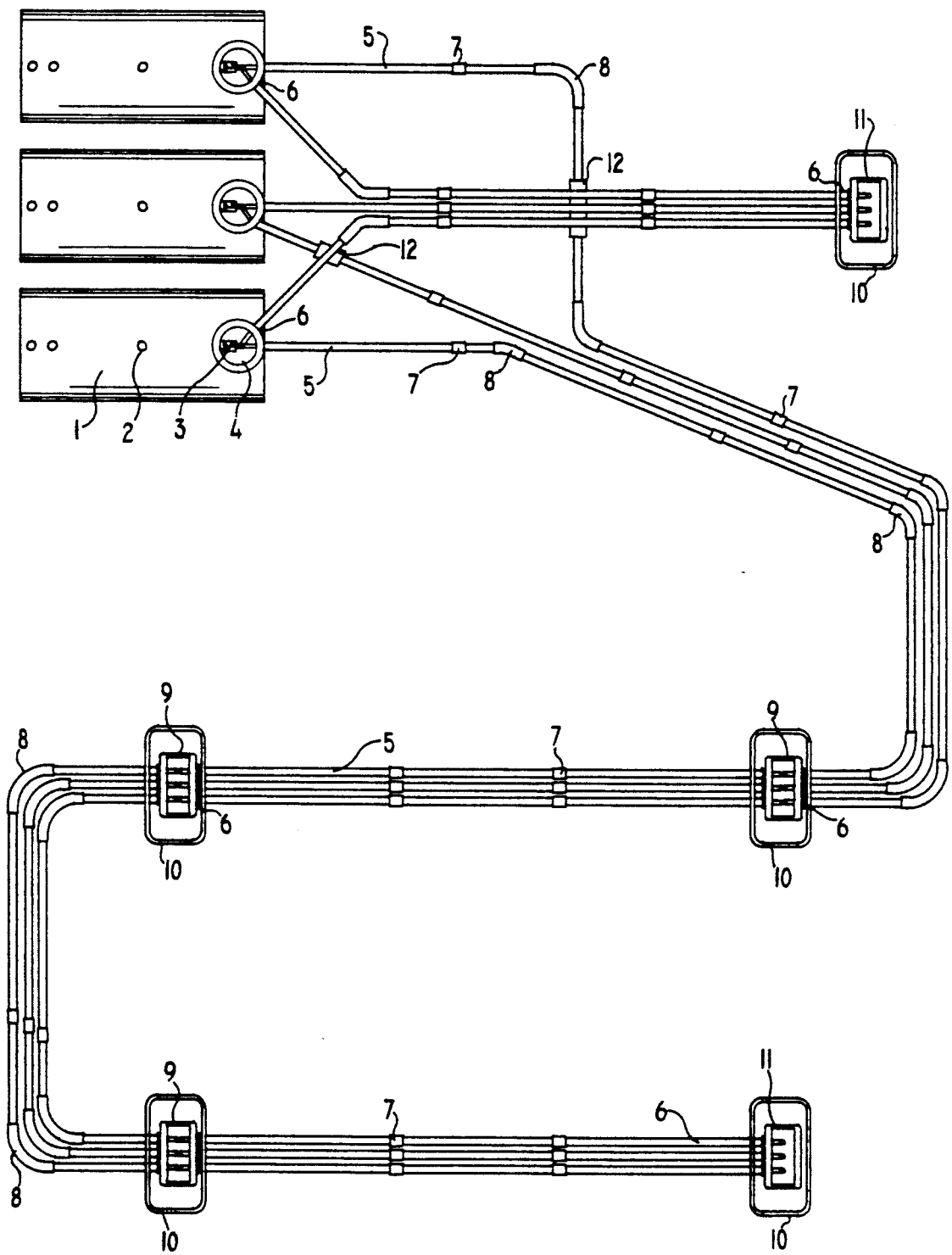
FIG. 1 is diagrammatic overhead plan view of a fuel storage, transmission and dispensing facility which includes originating, junction and terminating surface access chambers interconnected by a secondably contained piping system.

Refering to FIGS. 1, a typical service station facility primarily consists of one or more underground fuel storage tanks 1, fitted on top with numerous inner access bungs 2. Installed into and through one of the access bungs is the tank's pump 3 which is contained within the pump access chamber 4.

A non-flexible containment pipe section 5 exits through an opening in the originating chamber and a flexible entry seal 6 which is physically attached and sealed to the side wall of the originating chamber by means of internal fasteners. The non-flexible containment pipe is connected and sealed to the flexible entry seal, on the inside of the originating chamber by means of a metal band clamp.

Individual lengths of non-flexible containment pipe are interconnected together by couplings 7 and vahous directional couplings 8. The inside diameter and bend radius of these directional couplings is sufficient to permit the flexible supply pipe to be installed after the secondary containment system has been completly installed and integrity tested.

The directional couplings permits the non-flexible containment pipe to be connected in such a manner that it can be routed to the first junction chamber 9, which is installed within a pre-enginnered island form 10 which typically is installed above the ground surface. The non-flexible containment pipe enters the junction chamber though an opening in the lower side wall and through a pre-aftached flexible entry seal 6. The first non-flexible piping run terminates just beyond the inside opening of the flexible entry seal where it is sealed using the band clamp previously described.

In a junction chamber application, a second non-flexible containment piping run begins and exits on the opposite side wall of the junction chamber from where the first non-flexible piping run entered. This second piping run exits though the inside opening of the flexible entry seal 6 which is pre-attaced to the junction chamber over an opening in the wall.

The non-flexible containment pipe is then routed and connected to the next junction chamber in a manner as peviously described in the preceeding three paragraphs. This same procedure repeats itself again and again until the last terminating chamber 11 is reached, located at the end of a non-flexible containment piping line. Only one non-flexible containment piping run enters this terminating chamber and no containment piping exits on the opposite side.

For piping applications which have more than one containment piping run exiting the originating chamber, a typical routing of the second containment piping run will require the piping to cross over or under the first piping run. In order to prevent damage to one or both pipes at the crossover point, due to burial loads or constant vibration a crossover conduit section 12 is installed over the lower pipe to separate it from the upper pipe.

As illustrated at the top of FIG. 1, a containment piping line may not consist of any intermediate junction chambers but only one terminating chamber. In addition, fuel storage and distribution facilities will vary in the amount and arrangement of underground storage tanks and above ground product dispensers employed. This will result in a variety of pipe routing layouts other than that shown in FIG. 1, however the principal design factors of using a secondary containment system xvhich uses two or more surface access chambers interconnected by a non-flexible conta nment piping run that contains a flexible primary supply piping system, is still maintained.

Figure 2:
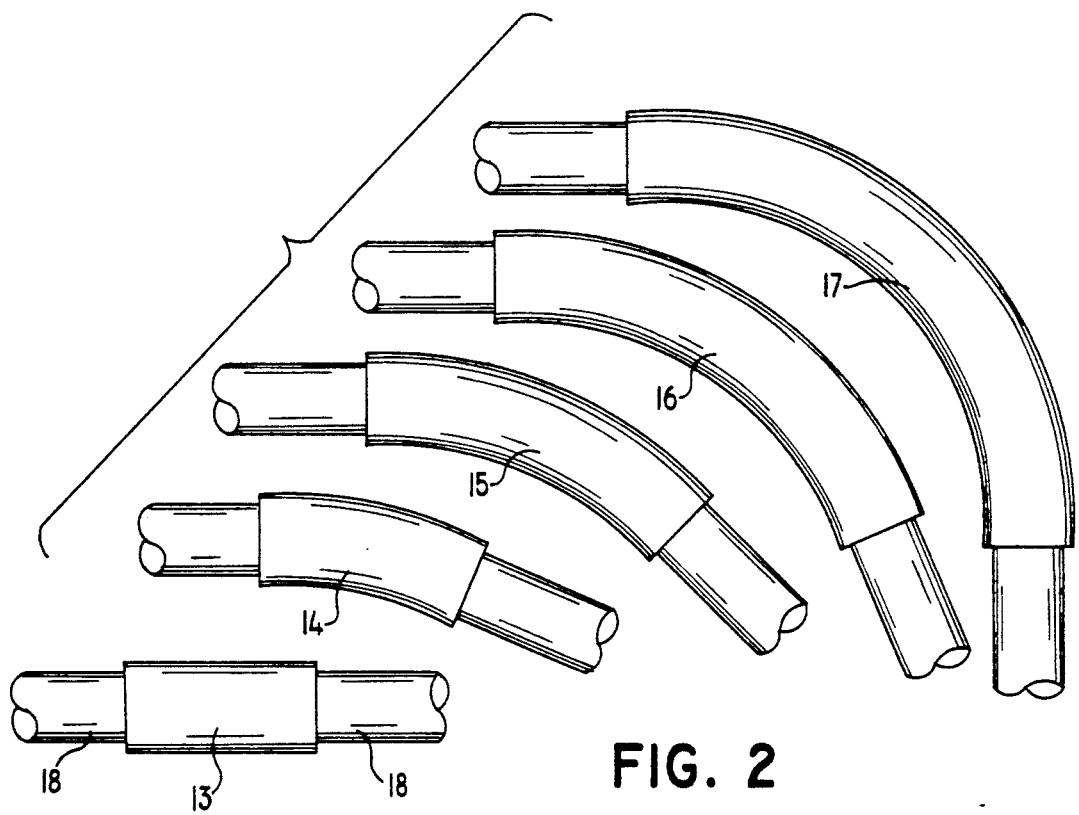
FIG. 2 is a side view of the non-flexible containment pipe lengths installed into four different directional long bend radius directional couplings and one straight coupling, all of which are joined by an adhesive resin.

FIG. 2 shows the staight cou6ling 13 which is used to connect two straight sections of non-flexible containment pipe 18 together. Also shown are the directional couplings which are available to change the direction and make connection of two lengths of non-flexible containment pipe. These directional couplings have a gradual directional turn so as not to interefere with the later installation of the flexible primary pipe which is fitted on each end with a hose coupling. The directional couplings shown consist of 22½ degree elbow fitting 14, a 45 degree elbow fitting 15, a 67½ degree elbow fitting 16 and a 90 degree elbow fitting 17.

Figure 3:
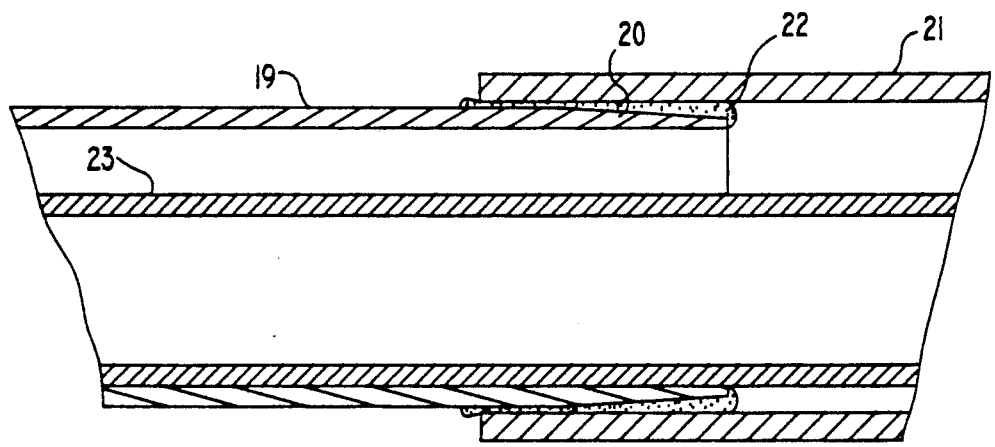
FIG. 3 is a sectional side view of the non-flexible containment pipe length installed into a coupling which is joined by an adhesive resin.

FIG. 3 shows the end section of a non-flexible containment pipe 19, which has a tapered end 20, installed inside a coupling 21. The joint created is an overlap joint whereby the couplings and fittings have a slightly larger inside diameter than the outside diameter of the end portion of the non-flexible containment pipe whereby a bonding adhesive 22 is applied between this overlap joint. The bonding adhesive used is generally a thermal-set, two-part resin which when cured creates a homogenous bond between the coupling and/or fittings and the non-flexible containment pipe. Also shown, is the smooth wall flexible supply pipe 23 deposed within the non-flexible containment pipe and coupling.

Figure 4:
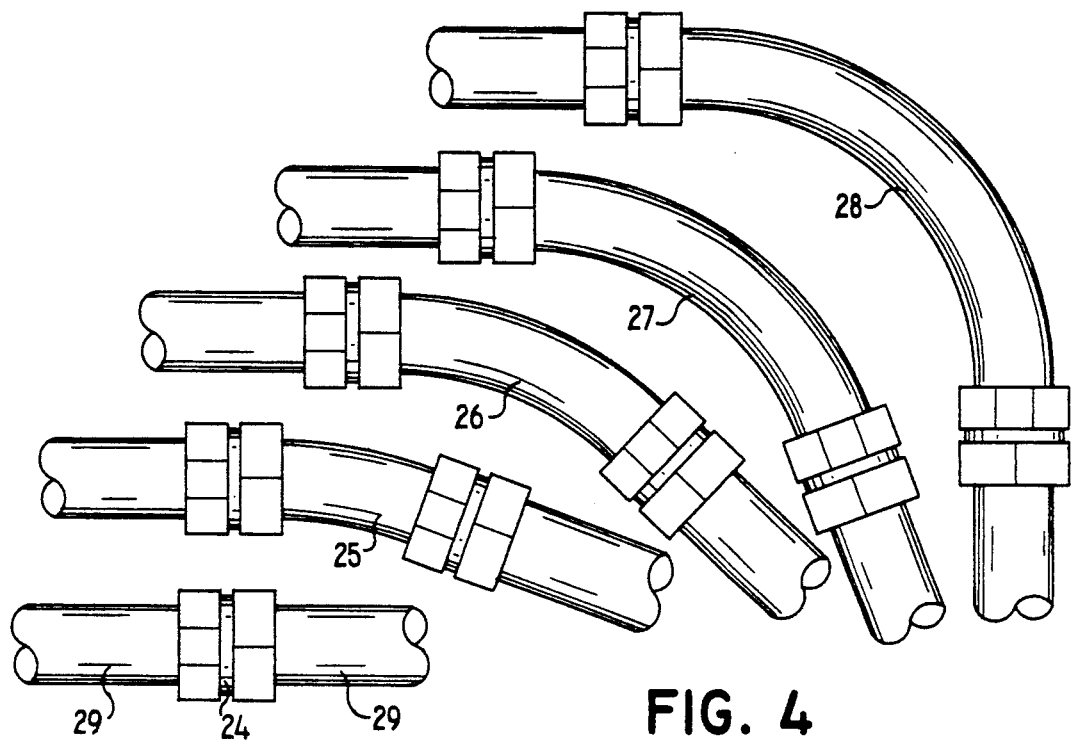
FIG. 4 is a side view of the non-flexible containment pipe lengths installed into four different directional long bend radius directional couplings, all of which are joined by means of compression coupling.

FIG. 4 shows the compression coupling 24 used to connect two straight sections 29 of non-flexible containment pipe together. Also shown are the directional couplings which are available to change the direction and make connection of two lengths of non-flexible containment pipe by means of the compression coupling located over both joints. These directional couplings have a gradual directional turn so as not to interfere with the later installation of the flexible primary pipe which is fitted on each end with a hose coupling. The directional couplings shown consist of 22½ degree elbow fitting 25, a 45 degree elbow fitting 26, a 67½ degree elbow fitting 27 and a 90 degree elbow fitting 28.

Note: These directional couplings can be made in the field by using conventional plastic pipe bending equipment.

Figure 5:
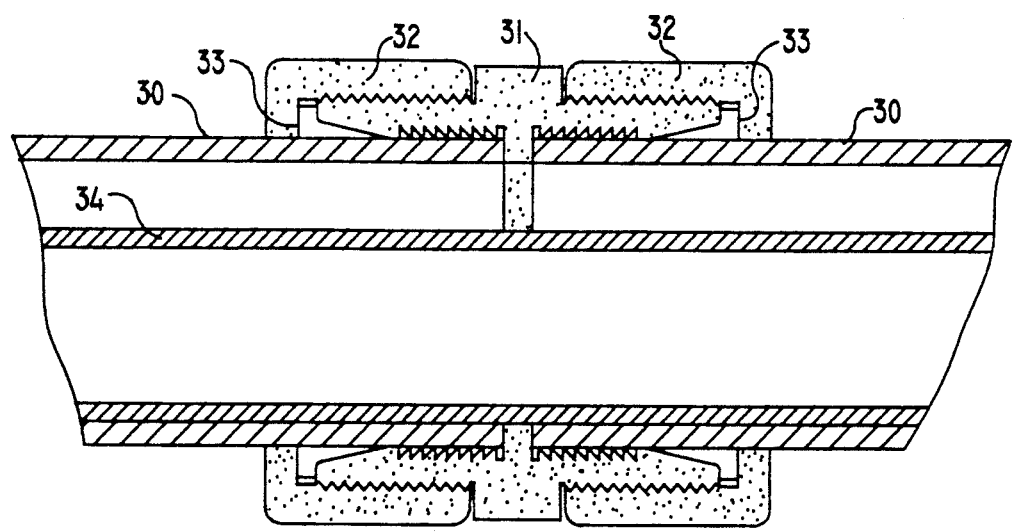
FIG. 5 is a sectional side view of two non-flexible containment pipe lengths joined together by means of a compression coupling.

FIG. 5 shows two end sections of a non-flexible containment pipe 30, installed inside a compression coupling 31. The joint created is an overlap butt joint whereby the compression couplings has a slightly larger inside diameter than the outside diameter of the end portion of the non-flexible containment pipe and also provides an internal stop to butt both ends of the non-flexible pipe. A tapered annular seal 33 is installed at the back end of the compression coupling and is compression wedged into a tapered section of the compression coupling by means of a threaded compression cuff 32. Also shown is the smooth wall flexible supply pipe 34 deposed within the non-flexible containment pipe and compression coupling.

Figure 6:
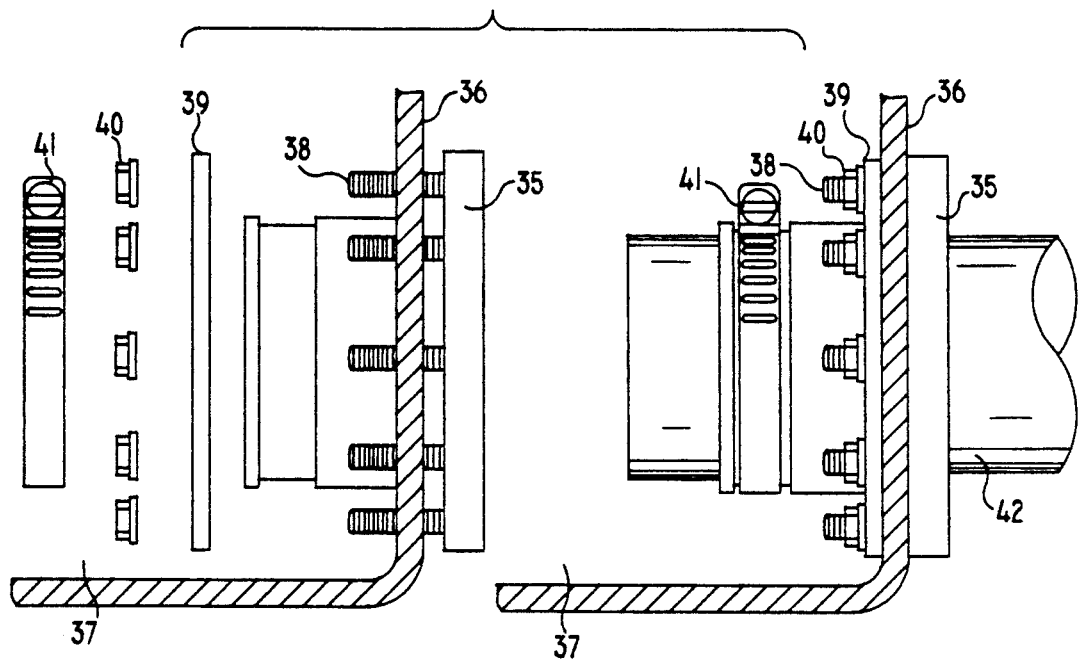
FIG. 6 is a sectional side view of an access chamber wall showing the installation and final assembly of a sealing device connected to the non-flexible containment pipe.

FIG. 6 shows how the flexible entry seal 35 is installed into the flat side wall 36 of a access sump 37. A opening and numerous bolt holes are drilled into the lower flat side wall and the flexible entry seal and its stud fasteners 38 are inserted through the opening and bolt holes. Once fully inserted, the metal compression ring 39 is installed over the protruding stud fasteners. Next the nut fasteners 40 are installed onto the stud fasteners and tightened. Next the metal band clamp 41 is then installed loosely over the opening of the flexible entry seal and the non-flexible containment pipe 42 is inserted into the opening of the flexible entry seal from outside the access sump. Once inserted, the end of the non-flexible containment pipe should extend about 2 inches beyond the inside opening of the flexible entry seal and then tighten the metal band clamp.

Figure 7:
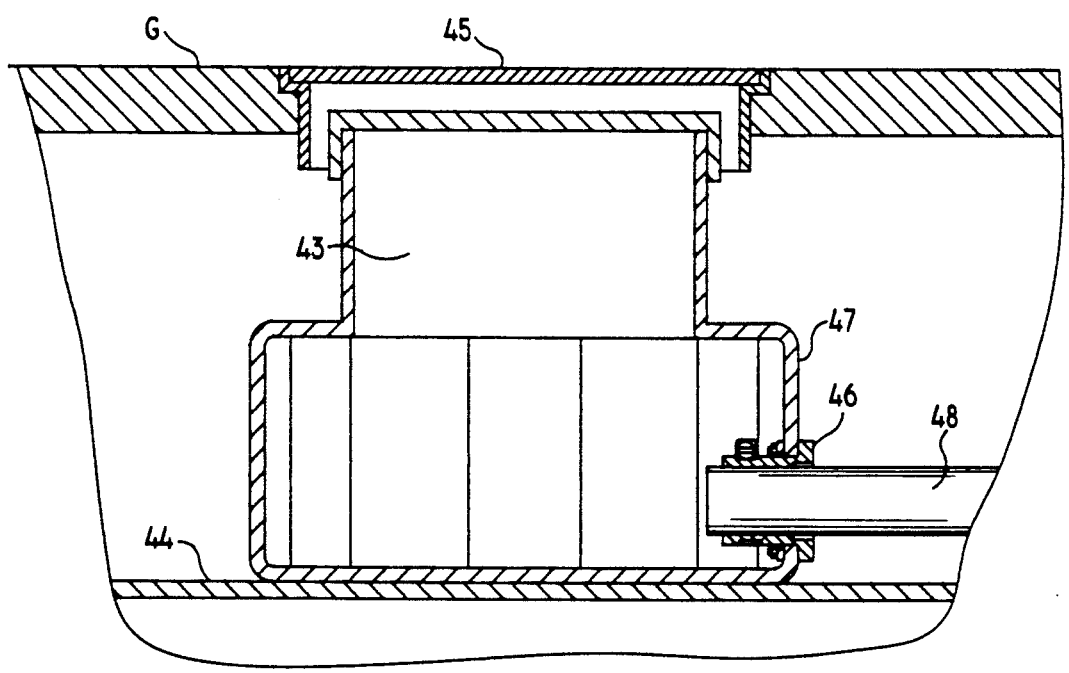
FIG. 7 is a sectional side view of the originating chamber showing the connection of one non-flexible containment pipe section to the wall of the chamber.

FIG. 7 shows an originating chamber 43 installed to the top of an underground storage tank 44 and situated under a steel access manhole cover 45. The originating chamber is shown to have a flexible entry seal 46 installed in the lower flat side wall 47 with a non-flexible containment pipe 48 installed within.

Figure 8:
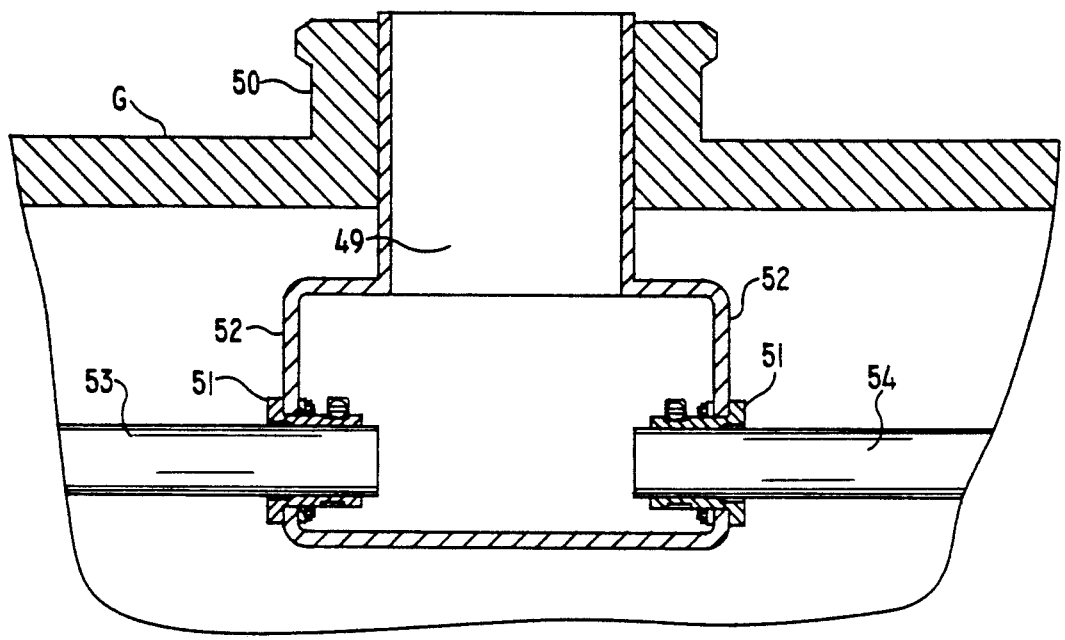
FIG. 8 is a sectional side view of the junction chamber showing the connection of two non-flexible containment pipe sections to the walls of the chamber.

FIG. 8 shows a junction chamber 49 installed within and under a dispenser island 50. The junction chamber is shown to have two flexible entry seals 51 installed into both lower side walls 52. One flexible entry seal is connected to a non-flexible containment pipe 53 which is entering the junction chamber and the other is connected to a non-flexible containment pipe 54 which is exiting the junction chamber.

Figure 9:
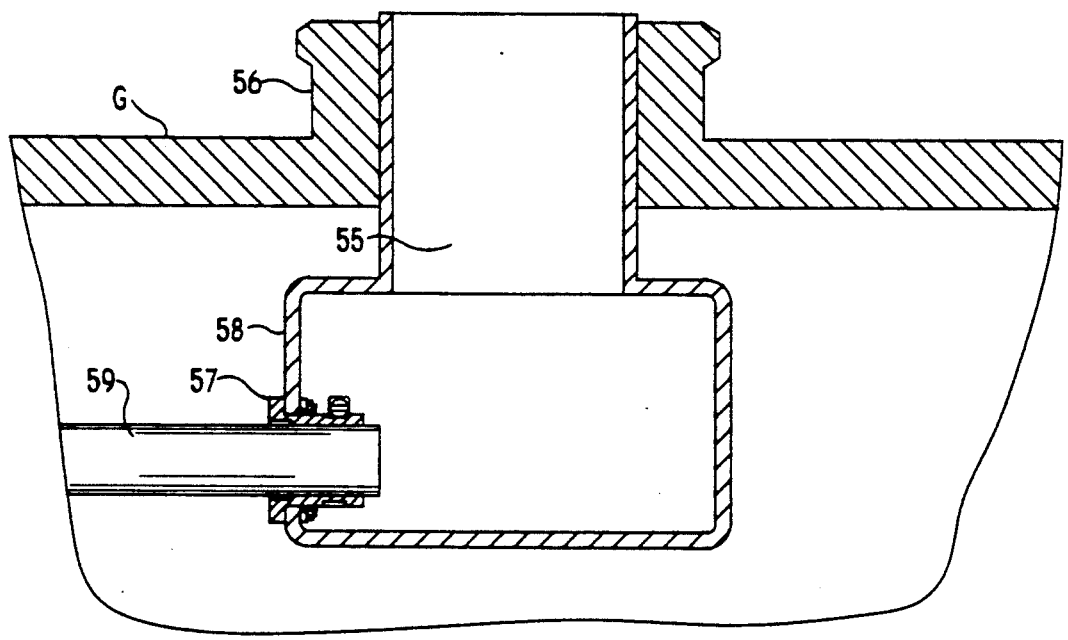
FIG. 9 is a sectional side view of the terminating chamber showing the connection of one non-flexible containment pipe section to the wall of the chamber.

FIG. 9 shows a terminating chamber 55 installed within and under a dispenser island 56. The terminating chamber is shown to have one flexible entry seal 57 installed into the lower side wall 58 with a non-flexible containment pipe 59 installed within. The connection of the non-flexible containment pipe to the flexible entry seal is the termination of the non-flexible secondary containment piping line.

Figure 10:
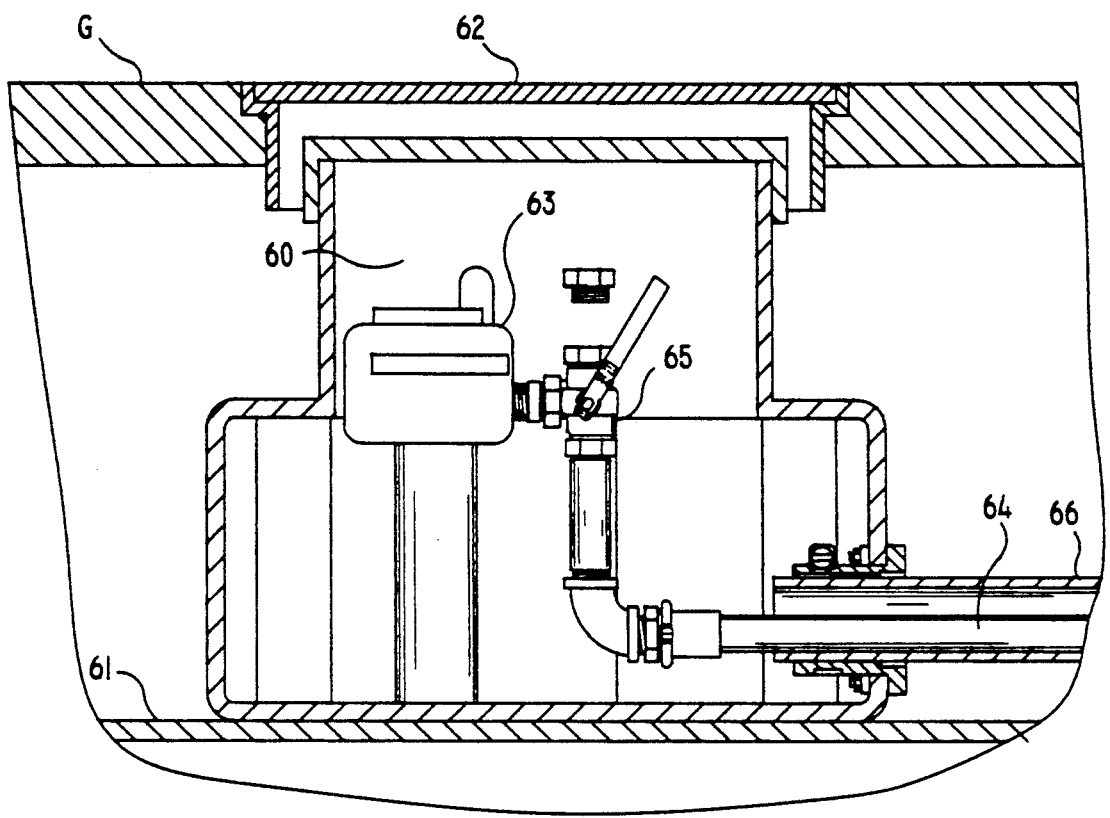
FIG. 10 is a sectional side view of a originating chamber showing one flexible supply pipe section installed within one non-flexible containment pipe section and connected to the tank's dispensing pump by the originating plumbing assembly.

FIG. 10 shows a originating chamber 60 installed to the top of an underground storage tank 61 and situated under a steel access manhole cover 62. The originating chamber is shown to have a dispensing pump 63 installed within the originating chamber and connected to the flexible supply pipe 64 by an originating plumbing assembly 65. The flexible supply pipe exiits the originating chamber through the non-flexible containment pipe 66.

Figure 11:
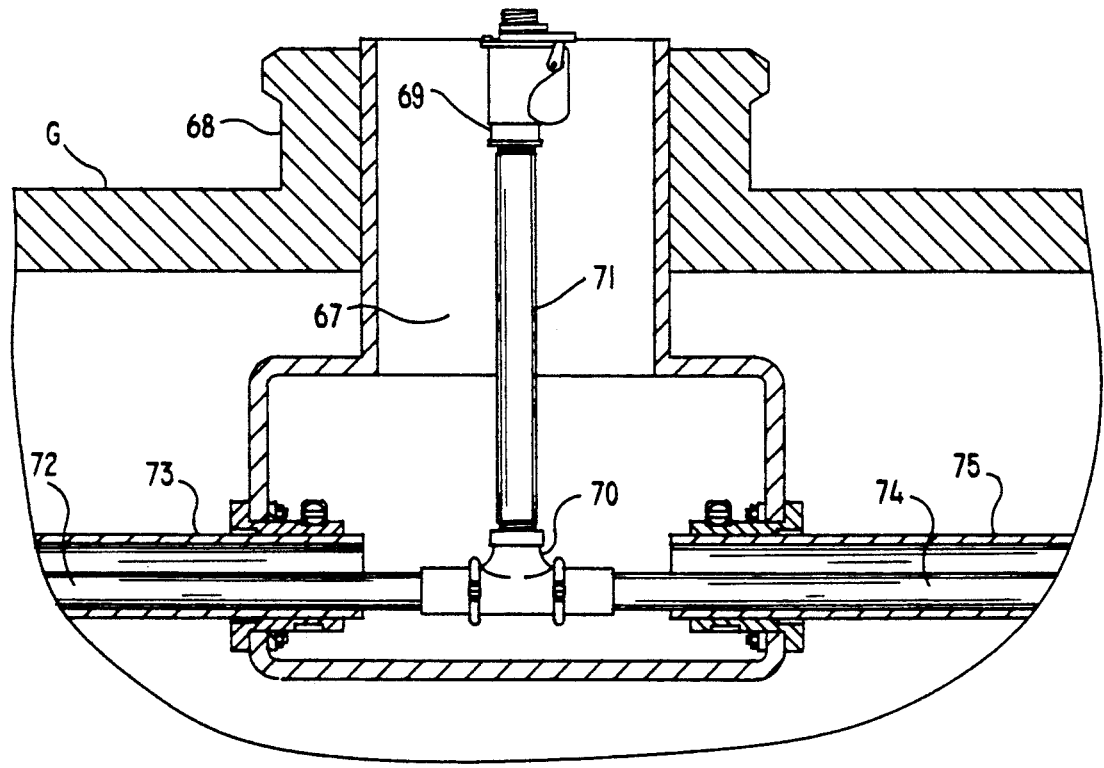
FIG. 11 is a sectional side view of the junction chamber showing two flexible supply pipe sections installed within two non-flexible containment pipe sections and connected to the dispenser's safety valve by the junction plumbing assembly.

FIG. 11 shows a junction chamber 67 installed within and under a dispenser island 68. The junction chamber is shown to have a dispenser safety valve 69 installed within and connected to the junction plumbing assembly 70 by a non-flexible supply pipe 71 section which is threaded on the upper end. The junction plumbing assembly is connected to one flexible primary pipe 72 which enters the junction chamber through the non-flexible containment pipe 73 and to another flexible supply pipe 74 which exits the junction chamber through the other non-flexible containment pipe 75.

Figure 12:
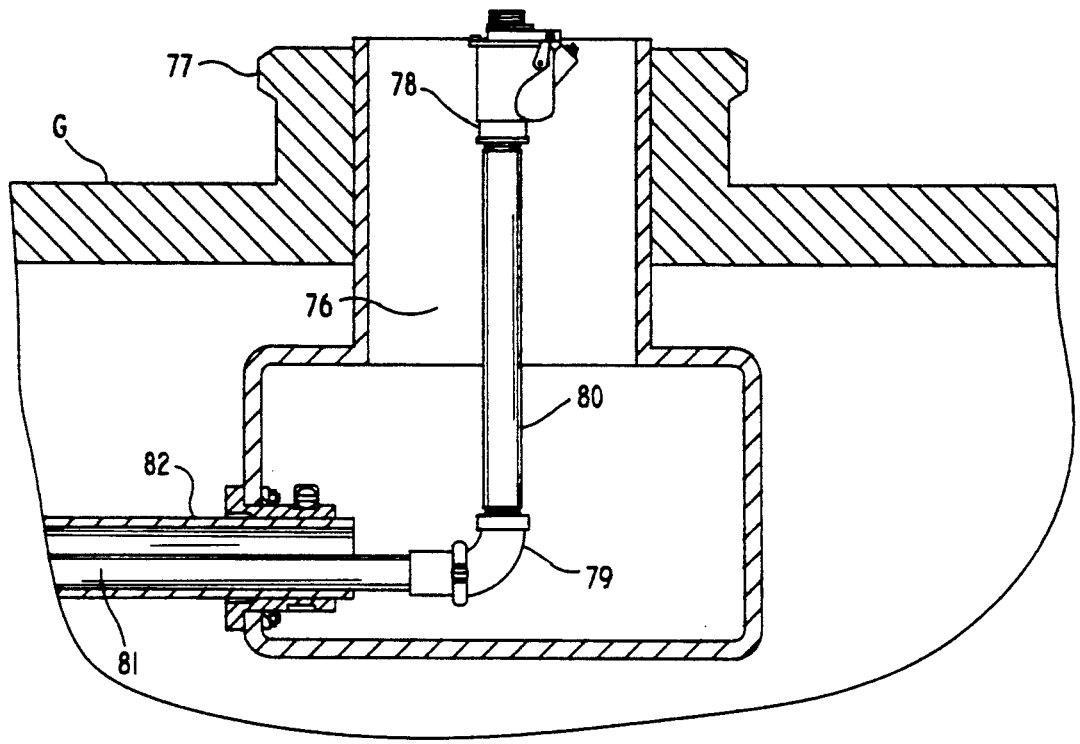
FIG. 12 is a sectional side view of the terminating chamber showing one flexible supply pipe section installed within one non-flexible containment pipe section and connected to the dispenser's safety valve by the terminating plumbing assembly

FIG. 12 shows a terminating chamber 76 installed within and under a dispenser island 77. The terminating chamber is shown to have a dispenser safety valve 78 installed within and connected to the terminating plumbing assembly 79 by a non-flexible supply pipe 80 section which is threaded on the upper end. The terminating plumbing assembly is connected the flexible primary pipe 81 which enters the terminating chamber through the non-flexible containment pipe 82. The final connection to the dispenser safety valve is the termination point of the supply piping line.

Figure 13:
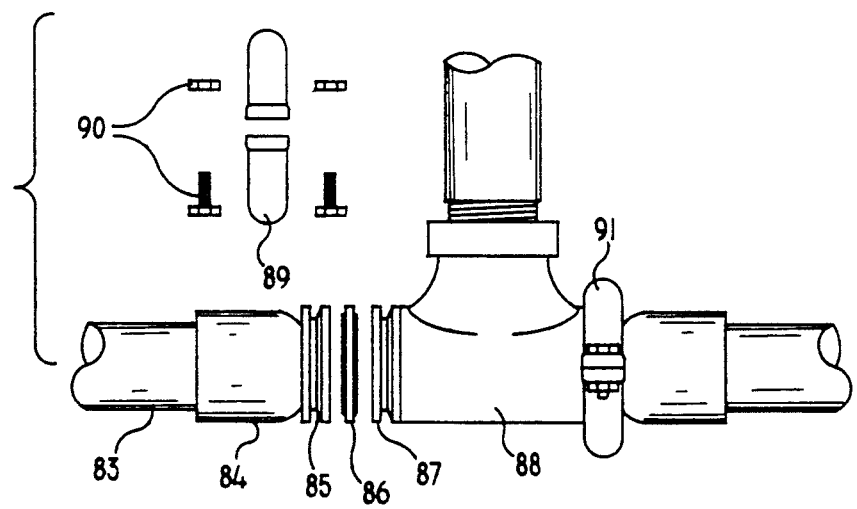
FIG. 13 is a side view of how the flexible supply pipe coupling is connected and sealed to a plumbing assembly.

FIG. 13 shows a means of attaching and sealing the flexible primary pipe 83 to a plumbing assembly 88. The flexible primary pipe section is fitted on each end with an internally expanded coupling 84 which has a butt flange profile 85. The fitting located at the low end of a plumbing assembly has an identical butt flange profile 87 as that of the coupling. The sealed connection is made by compressing an o-ring seal (Viton rubber) 86 between the butt flange of the couping and the butt face flange of the primary fitting by means of a clamshell clamp 89 which is drawn together over both butt flanges by means of two bolt fasteners 90. Once the clamshell clamp 91 is assembled, it provides a high pressure rated sealed connection. This connection and sealing method requires only a nut drive to tighten the fasteners. This makes for a faster more convenient installation and quick disconnect of the coupling if necessary. This system also eliminates the need for a male and female threaded connections, like used on other flexible supply pipe products, which can strip or be insufficiently tightened, resulting in a leak. The short length and low profile of the coupling device, of the invention, permits the secondary containment pipe line to have a smaller inside pipe diameter and make directional turns with a shorter bend radius. Other flexible supply pipe products use longer and larger profile couplings and require a containment pipe with a larger inside diameter, in order to prevent pipe hang-ups when incountering short directional turns.

Figure 14:
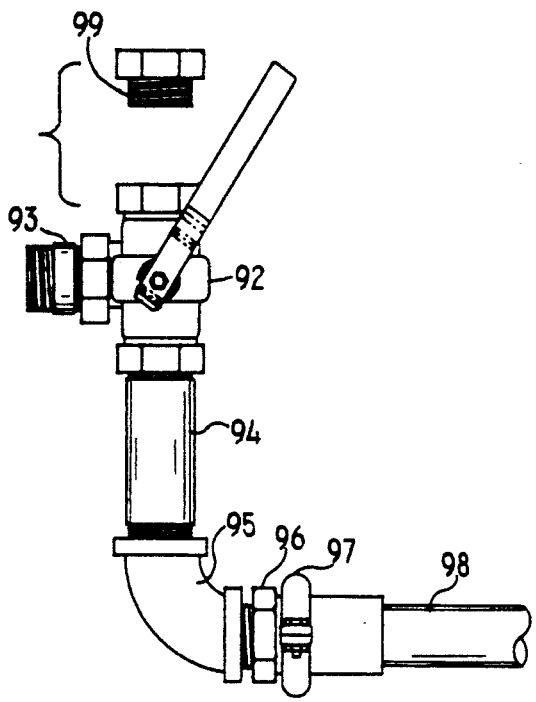
FIG. 14 is a side view of a single outlet plumbing tree assembly which connects the tank's pump to one flexible supply pipe section, all contained within the originating chamber.

FIG. 14 shows a side view of the single originating plumbing assembly which is installed inside the originating chamber to provide a plumbing transition from the dispensing pump to a single flexible supply piping line. The single originating plumbing assembly consists of three-way diverter valve 92 which permits the tank and pump to be isolated (shut-off) from the supply piping line. The single originating plumbing assembly is connected to the dispensing pump by means of a threaded nipple 93. A threaded extention nipple 94, which is connected to the underside opening of the diverted valve, is cut-to-length for height adjustability of the elbow fitting 95, which is the lower section of the single originating plumbing assembly. The elbow fitting is fitted with a butt flange coupling 96 to make the transition from a threaded opening to a butt flange profile for connection of the supply pipe coupling 98 by means of the clamsheell clamp 97. The diverter valve has a threaded opening to accept a threaded plug 99. This threaded opening can be used to install vahous types of in-line leak detection devices.

Figure 15:
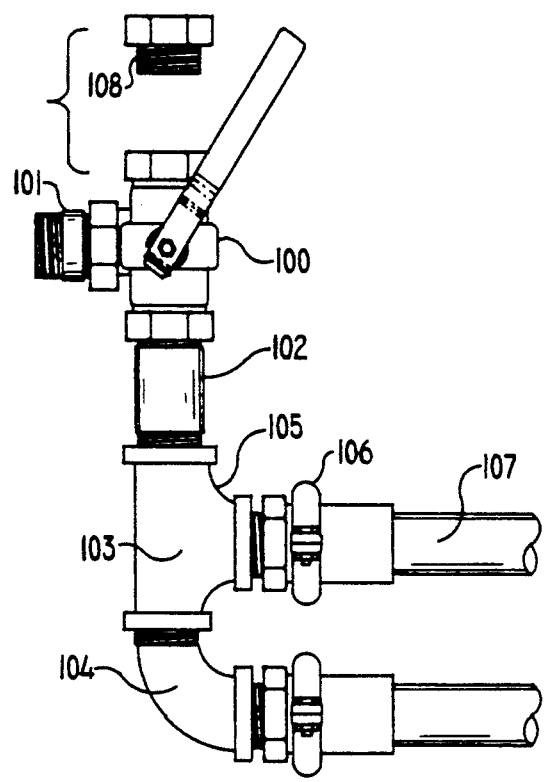
FIG. 15 is a side view of a dual outlet plumbing tree assembly which connects the tank's pump to two flexible supply pipe sections, all contained within the originating chamber.

FIG. 15 shows a side view of the dual originating plumbing assembly which is installed inside the originating chamber to provide a plumbing transition from the dispensing pump to two flexible supply piping lines. The dual originating plumbing assembly consists of three-way diverter valve 100 which premits the tank and pump to be isolated (shut-off) from the primary piping line. The plumbing tree is connected to the dispensing pump by means of a threaded nipple 101. A threaded extention nipple 102, which is connected to the diverter valve, is cut-to-length for height adjustability of the primary tee fitting 103, which is attached directly below. A primary street elbow fitting 104 is attached directly to the primary tee fitting to provide the second outlet. A butt flange coupling 105 is attached to the tee fitting and the street elbow fitting, of the dual originating plumbing assembly, to make the transition from a threaded opening to a butt flange profile for connection of both primary pipe couplings 107 by means of the clamshell clamps 106. The diverter valve has a threaded opening to accept a threaded plug 108. This threaded opening can be used to install various types of in-line leak detection devices. Employing the use of the dual outlet plumbing tree, connected to the tank's dispensing pump, provides a means of exiting the originating chamber with two double wall piping lines, one at a slightly higher elevation than the other. Exiting with two seperate dispensing piping lines at different elevations permits pipe crossovers, described and shown shown in FIGS. 1 and 18 without creating low points in non-flexible containment piping, between access sumps, which could result in collection of leaking product. Another advantage of existing the pump access sump with two dispensing piping lines is that more above ground product dispensers may be supplied before there is a significant drop in fluid head pressure which can effect the volume of product which is dispensed at the above ground product dispenser. Typically a dispensing range of six to ten gallons per minute flow rating is acceptable for a retail fuel outlet such as a service station. One dispensing piping line supplying to many above ground product dispenser could result in a severe reduction, below the accepatable levels, if all of the product dispensers were activated simultaneously.

Figure 16:
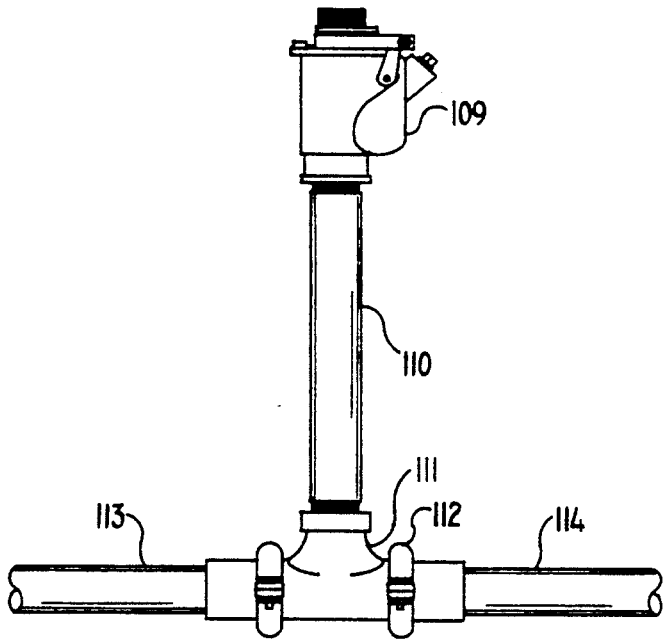
FIG. 16 is a side view of a junction plumbing assembly interconnected by two flexible supply pipe sections and one non-flexible supply pipe section which connects to the dispensers safety valve, all contained within the junction chamber.

FIG. 16 shows a side view of the junction plumbing assembly located inside of a junction chamber. This junction plumbing assembly consists of a safety valve 109 or shear valve which is designed to shear its connection to the above ground fuel dispenser, in the event that the dispenser cabinet should be knocked over in an accident. At the same moment an internal spring loaded flapper valve shuts-off any escaping fuel from the underground piping line. The safety valve is connected to the tee fitting 111 by a non-flexible threaded pipe 110, both components of the junction plumbing assembly, which is cut to length and threaded for height adjustability of the tee fitting. Both the incoming flexible supply pipe 113 and the outgoing flexible supply pipe 114 are connected to the junction plumbing assembly at the tee fitting, by means of the two clamshell clamps 112.

Figure 17:
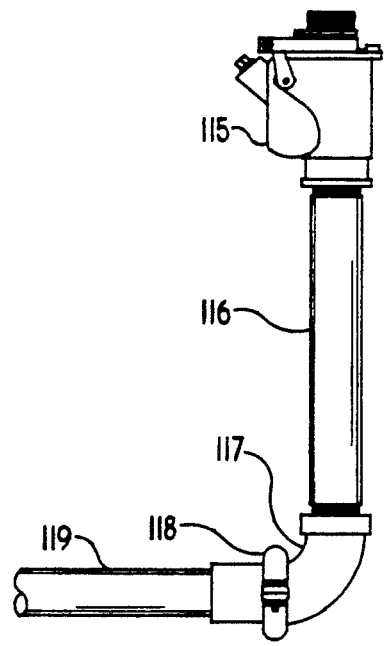
FIG. 17 is a side view of a terminating plumbing assembly interconnected by one flexible supply pipe section and one non-flexible supply pipe section which connects to the dispenser safety valve, all contained within the terminating chamber.

FIG. 17 shows a side view of the terminating plumbing assembly located inside of a terminating chamber. This terminating plumbing assembly consists of a safety valve 115 or shear valve, which is designed to shear its connection to the above ground fuel dispenser, in the event that the dispenser cabinet should be knocked over in an accident. A the same moment an internal spring loaded flapper valve shuts-off any escaping fuel from the underground piping. The safety valve is connected to the supply elbow fitting 117 by a nonflexible threaded pipe 116, both components of the junction plumbing assembly, which is cut to length and threaded for height adjustability of the supply tee fitting. The incoming and terminating flexible supply pipe 118 is connected to the supply elbow fitting by means of the clamshell clamp 119.

Figure 18:
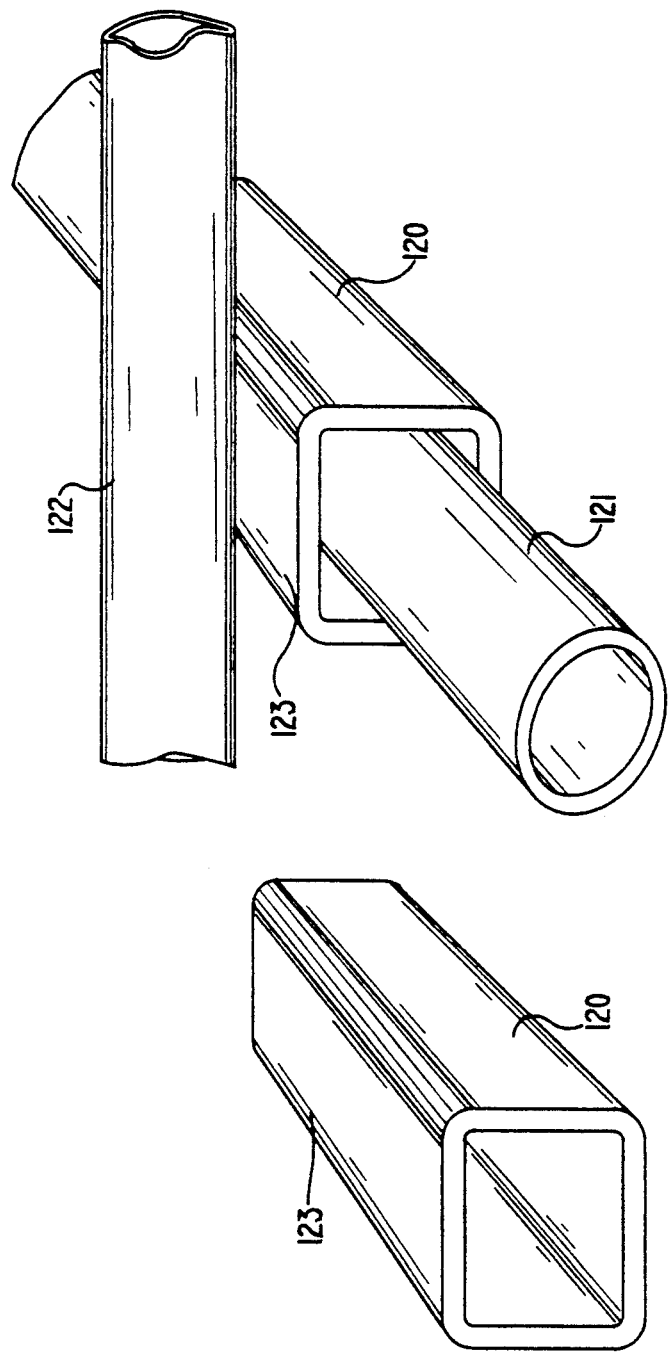
FIG. 18 is a perspective view of cross-over conduit with the non-flexible containment pipe installed inside and overhead.

FIG. 18 shows a section crossover conduit 120. Also shown is how the crossover conduit is installed with the lower crossing non-flexible containment pipe 121 passing through the crossover conduit and the upper crossing non-flexible pipe 122 passing over the upper flat surface 123 of the crossover conduit.

An important consideration of the invention, not previously mentioned, is that the secondary containment system may be completely installed, integrity tested and backfilled to grade level prior fabricating and installing the primary supply piping system. This has significant installation advantages with respect to time considerations for weather conditions, rental or time use of excavation equipment, delivery scheduling of backfill materials and the removal of stored backfill piles from the site to permit other installation activities to proceed which would generally be required to wait until the entire double wall piping system is complete. The design of the secondary system is such that it provides sufficient room within a chamber to install a flexible supply pipe section, fitted on each end with a connection coupling, down through the chamber opening and into the opening of the non-flexible containment pipe. The non-flexible containment pipe sections are of sufficient size to accept the insertion of flexible supply pipe and directional containment couplings which have a predetermined and fixed bend radius of sufficient radius and size to premit the flexible supply pipe section to change direction without interference.

Another consideration of the invention is that flexible supply pipe is made from composite thermal-plastic materials (nylon/polyeuathane composit) which provides a fuel impermeable (less than one percent (1%) weight loss per foot over 280 days) wall construction. For example, it is very important to provide a flexible primary pipe which will reduce, or eliminate altogether, the transmission of aromatic vapors of gasoline and its chemical additives. Considering the circumstance that the flexible supply pipe is installed underground where these aromatic explosive vapors could collect and create a potentially explosive atmosphere inside of a secondary containment system of which it is contained.

In addition, the flexible supply pipe of the invention has a significant number of other improvements over other flexible supply products, already on the market, which are contained by a flexible and continuous containment pipe system. Some of these improvements are disclosed as follows: (a) The flexible supply pipe of the invention, has both a smooth inner surface and smooth outer surface which provides an ideal wall profile for attaching a conventional, internally expandible, coupling device which has a history of proven leak free performance. (b) The flexible supply pipe of the invention has an inner surface which is smooth and made of a low-resistance material (shiny and slick) which provides a higher hydraulic performance rating which means more dispensing gallons of liquid per lineal foot of distance. (c) The flexible supply pipe of the invention has a continously wound fiber reinforcement encapsulated within the outer smooth layer and inner smooth layer which provides a highly pressure capable (400 psi operating pressure) which reduces pipe kicking due to pressure surges and eliminates pipe expansion which can effect sensitive in-line leak detection systems. The two hard, semi-rigid and strong nylon layers also serve to provide additional pipe stength. (d) The flexible supply pipe of the invention, provides an outer surface which is made of a low resistance material (shiny and Slick) in combination with a wall construction which provides only moderate amount of flexibility. This combination of features allows the flexible supply pipe to be inserted into the non-flexible containment pipe and pushed from one access chamber to the next without the need for lubrication or pulling assistance from the other end. Note: The non-flexible containment pipe is made of a very hard plastic material which provides a very low resistance (shiny and slick) smooth surface (non-corrugated) so at not to interfere with installation of the flexible primary pipe.

What is claimed:

1. A secondarily contained underground piping system which connects the dispensing pump of an underground storage tank to an above ground terminating dispensing unit comprising:
   a) an originating chamber installed around the dispensing pump located at the beginniing of a pipe line, providing a means of surface access, secondary containment and leak collection;
   b) a junction chamber installed under an above ground dispensing unit located within the piping line providing a means of surface access, secondary containment and leak collection;
   c) a terminating chamber installed under an above ground dispensing unit located at the end of the piping line, providing a means of surface access, secondary containment and leak collection;
   d) a non-flexible containment pipe section, comprising a plurality of straight, non-flexible pipe lengths, joined together by coupling means having an inside diameter of sufficient size, and a directional bend radious of sufficient length to permit a flexible supply pipe section to be inserted from one end to the other, said non-flexible containment piping sections being interconnected to said chambers through openings in the side wall of the chambers;
   e) a flexible supply pipe section having couplings installed on each end as a means of interconecting one plumbing assembly to the next through the non-flexible containment pipe section;
   f) a sealing device, providing a means of mechanically sealing all pipe entries and exit openings located in the side walls of the chambers, to the annular wall of the non-flexible containment pipe section, whereby the joint is liquid tight and secure;
   g) an originating plumbing assembly providing an interface connecting the dispensing pump in the originating chamber;
   h) a junctioin plumbing assembly providing an interface for the dispensing unit and flexible pipe sections, connected to the above ground dispensing unit, by means of a safety valve, contained within a junction dispenser chamber; and
   i) a terminating plumbing assembly providing an interface for the tank dispensing pump and flexible primary supply pipe section.

2. A secondarily contained underground piping system as claimed in claim 1 wherein the containment system components may be installed, connected, integrity tested, inspected for leaks and then backfilled to grade, prior to installing any of the supply system components.

3. A secondarily contained underground piping system as claimed in claim 1 wherein all of the supply system components may be installed, connected, integrity tested, inspect for leaks after the containment system has been installed and backfilled to grade.

4. A secondarily contained underground pipinig system as claimed in claim 1 wherein said non-flexible containment pipe sections have smooth inner and outer walls and are made of glass fiber reinforced thermo-set plastic material which are bonded together.

5. A secondarily contained underground piping system as claimed in claim 1 wherein said non-flexible containment pipe sections have smooth inner and outer walls and are made of a thermo-plastic material joined together by a nylon compression fitting with internal seals.

6. A secondarily contained underground piping system as claimed in claim 1 wherein said flexible supply pipe has smooth inner and outer surfaces and is made of fiber reinforced thermal plastic composite material.

7. A secondarily contained underground piping system as claimed in claim 1 wherein the flexible supply pipe couplings make a fluid tight connection to a plumbing assembly by means of two butt flanges compressing a rubber O-ring by means of an annular clamshell clamp compressed together by fasteners.

8. A secondarily contained underground piping system as claimed in claim 1 wherein said interconnected chambers provide a system for collection and detection of fluids, which may originate from inside or outside the containment system.

9. A secondarily contained underground piping system as claimed in claim 1 wherein said chambers have means for surface access to all of the primary piping connections, containment piping connections, flexible seal connections and chamber connections.

10. A secondarily contained underground piping system as claimed in claim 1 including non-flexible containment pipe crossovers supported by a support conduit positioned under the crossover pipe.

11. A secondarily contained underground piping system which connects the dispensing pump of an underground storage tank to an above ground terminating dispensing unit comprising:
   a) an originating chamber installed around the dispensing pump located at the beginning of a pipe line, providing a means of surface access, secondary containment and leak collection;
   b) a junction chamber installed under an above ground dispensing unit located within the piping line providing a means of surface access, secondary containment and leak collection;
   c) a terminating chamber installed under an above ground dispensing unit located at the end of the piping line, providing a means of surface access, secondary containment and leak collection;
   d) a non-flexible containment pipe section, comprising a plurality of straight, non-flexible pipe lengths, joined together by coupling means having an inside diameter of sufficient size, and a directional bend radius of sufficient length to permit a flexible supply pipe section to be inserted from one end to the other, said non-flexible containment piping sections being interconnected to said chambers through openings in the side wall of the chambers;

e) a flexible supply pipe section having couplings installed on each end as a means of interconnecting one plumbing assembly to the next through the non-flexible containment pipe section;

f) a sealing device, providing a means of mechanically sealing all pipe entries and exit openings located in teh side walls of the chambers, to the annular wall of the non-flexible containment pipe section, whereby the joint is liquid tight and secure;

g) an originating plumbing assembly providing an interface connecting the dispensing pump in the originating chamber;

h) a junction plumbing assembly providing an interface for the dispensing unit and flexible pipe sections, connected to the above ground dispensing unit, by means of a safety valve, contained within a junction dispenser chamber; and i) a terminating plumbing assembly providing an interface for the tank dispensing pump and flexible primary supply pipe section.

12. A secondarily contained underground piping system which connects the dispensing pump of an udnerground storage tank to an above ground terminating dispensing unit comprising:

a) an originating chamber installed around the dispensing pump located at the beginning of a pipe line, providing a means fo surface access, secondary containment and leak collection;

b) a junction chamber installed under an above ground dispensing unit located within the piping line providing a means of surface access, secondary containment and leak collection;

c) a terminating chamber installed under an above ground dispensing unit located at the end of the piping line, providing a means of surface access, secondary containment and leak collection;

d) a non-flexible containment pipe section, comprisng a plurality of straight, non-flexible pipe lengths, joined together by coupling means having an inside diameter of sufficient size, and a directional bend radius of sufficient length to permit a flexible supply pipe section to be inserted from one end to the other, said non-flexible containment piping sections being interconnected to said chambers through openings in the side wall of the chambers;

e) a flexible supply pipe section having couplings installed on each end as a means of interconnecting one plumbing assembly to the next through the non-flexible containment pipe section;

f) a sealing device, providing a means of mechanically sealing all pipe entries and exit openings located in the side walls of the chambers, to the annular wall of the non-flexible containment pipe section, whereby the joint is liquid tight and secure.

13. A secondarily contained underground piping system which connects the dispensing pump of an underground storage tank to an above ground terminating dispensing unit comprising:

a) an originating chamber installed around the dispensing pump located at the beginning of a pipe line;

b) a junction chamber installed under an above ground dispensing unit located within the piping line;

c) a terminating chamber installed under an above ground dispensing unit located at the end of the piping line;

d) a non-flexible containment piping section, comprising a plurality of straight, non-flexible pipe lengths, joined together by coupling means having an inside diameter of sufficient size, and a directional bend radius of sufficient length to permit a flexible supply pipe section to be inserted from one end to the other, said sections being interconnected to said chambers through openings in the side wall of the chambers;

e) a flexible supply pipe section having couplings installed on each end as a means of interconnecting a plumbing assembly to the next through the non-flexible containment pipe section; and f) a sealing device, providing a means of mechanically sealing all pipe entries and exit openings located in the side walls of the chambers, to the annular wall of the non-flexible containment pipe, whereby the joint is liquid tight and secure.

14. A secondarily contained underground piping system as claimed in claim 13 wherein the containment system components may be installed, connected, integrity tested, inspected for leaks and then backfilled to grade, prior to installing any of the supply system components.

15. A secondarily contained underground piping system as claimed in claim 13 wherein all of the supply system components may be installed, connected, integrity tested, inspect for leaks after the containment system has been installed and backfilled to grade.

16. A secondarily contained underground piping system as claimed in claim 13 wherein said non-flexible containment pipe sections have smooth inner and outer walls and are made of glass fiber reinforced thermo-set plastic material which are bonded together.

17. A secondarily contained underground piping system as claimed in claim 13 wherein said non-flexible containment pipe sections have smooth inner and outer walls and are made of a thermo-plastic material joined together by a nylon compression fitting with internal seals.

18. A secondarily contained underground piping system as claimed in claim 13 wherein said flexible supply pipe has smooth inner and outer surfaces and is made of fiber reinforced thermal plastic composite material.

19. A secondarily contained underground piping system as claimed in claim 13 wherein the flexible supply pipe couplings make a fluid tight connection to a plumbing assembly by means of two butt flanges compressing a rubber o-ring by means of an annular clamshell clamp compressed together by fasteners.

20. A secondarily contained underground piping system as claimed in claim 13 wherein said interconnected chambers provide a system for collection and detection of fluids, which may originate from inside or outside the containment system.

21. A secondarily contained underground piping system as claimed in claim 13 wherein said chambers have means for surface access to all of the primary piping connections, containment piping connections, flexible seal connections and chamber connections.

22. A secondarily contained underground piping system as claimed in claim 13 including non-flexible containment pipe crossovers supported by a support conduit positioned under the crossover pipe.

23. A secondarily contained underground piping system which connects the dispensing pump of an underground storage tank to an above ground terminating dispensing unit comprising:
   a) an originating chamber installed around the dispensing pump located at the beginning of a pipe line, providing a means of surface access, secondary containment and leak collection;
   b) a junction chamber installed under an above ground dispensing unit located within the piping line providing a means of surface access, secondary containment and leak collection;
   c) a terminating chember installed under an above ground dispensing unit located at the end of the piping line, providing a means of surface access, secondary containment and leak collection;
   d) a non-flexible containment piping section, comprising a plurality of straight, non-flexible pipe lengths, joined together by coupling means having an inside diameter of sufficient size, and a directional bend radius of sufficient length to permit a flexible supply pipe section to be inserted from one end to the other, said sections being interconnected to said chambers through openings in the side wall of the chambers;
   e) a flexible supply pipe section having couplings installed on each end as a means of interconnecting a plumbing assembly to the next through the non-flexible containment pipe section; and
   f) a sealing device, providing a means of mechanically sealing all pipe entries and exit openings located in the side walls of the chambers, to the annular wall of the non-flexible containment pipe, whereby the joint is liquid tight and secure.

24. A secondarily contained underground piping system as claimed in claim 23 wherein the ends of the non-flexible containment piping sections are tapered and fit inside a coupling to provide an overlap joint whereby the coupling and fitting have a slightly larger inside diameter than the outside diameter of the end portion of the non-flexible containment pipe section and a bonding adhesive between the overlap joint.

25. A secondarily contained underground piping system as claimed in claim 23 including a compression coupling joining the ends of said non-flexible pipe sections including a tapered annular seal installed within the compression coupling wedged into a tapered section of the compression coupling by means of a threaded compression cuff 32.

* * * * *

REEXAMINATION CERTIFICATE (2785th)
United States Patent [19]
Webb

[11] B1 5,263,794
[45] Certificate Issued * Jan. 23, 1996

[54] ENVIRONMENTALLY SAFE UNDERGROUND PIPING SYSTEM

[75] Inventor: Michael C. Webb, Chester Springs, Pa.

[73] Assignee: Environ Products, Inc., Lionville, Pa.

Reexamination Request:
No. 90/003,761, Mar. 22, 1995

Reexamination Certificate for:
Patent No.: 5,263,794
Issued: Nov. 23, 1993
Appl. No.: 838,615
Filed: Feb. 19, 1992

[ * ] Notice: The portion of the term of this patent subsequent to Mar. 29, 2011, has been disclaimed.

[51] Int. Cl.⁶ ........................................... F16L 1/00
[52] U.S. Cl. .................... 405/52; 405/154; 588/249

[56] References Cited

U.S. PATENT DOCUMENTS

| | | | |
|---|---|---|---|
| 4,971,477 | 11/1990 | Webb et al. | 405/154 |
| 5,098,221 | 3/1992 | Osborne | 405/52 |

*Primary Examiner*—Dennis L. Taylor

[57] ABSTRACT

An environmentally safe underground piping system which employes a inner flexible fluid supply piping system contained within an outer non-flexible containment piping system which interconnects a series of surface access chambers. Both the flexible supply and and non-flexible containment piping systems are interconnected by a series of directional fittings and couplings. The containment system may be installed, integrity tested, inspected and backfilled, prior to installation of the supply piping system which allows for a faster and more economical installation.

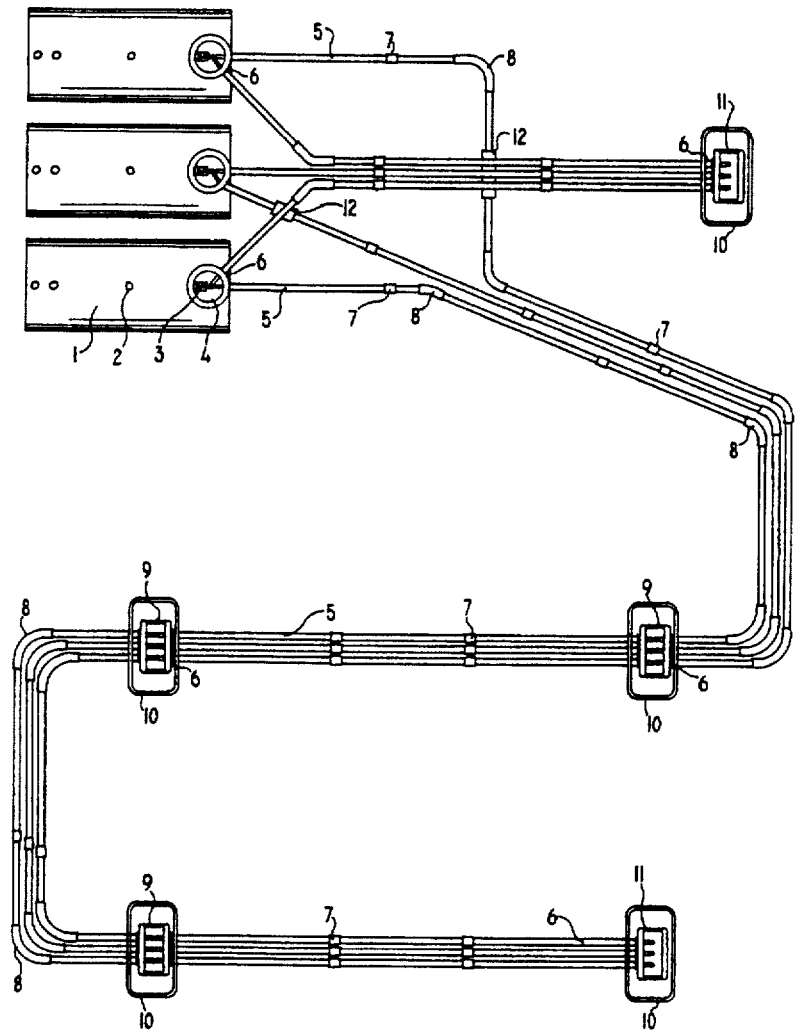

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–5, 10, 14–17 and 22 is confirmed.

Claims 1, 11–13 and 23 are cancelled.

Claims 6–9, 18–21, 24 and 25 are determined to be patentable as amended.

6. A secondarily contained underground piping system as claimed in claim [1] *3* wherein said flexible supply pipe has smooth inner and outer surfaces and is made of fiber reinforced thermal plastic composite material.

7. A secondarily contained underground piping system as claimed in claim [1] *3* wherein the flexible supply pipe couplings make a fluid tight connection to a plumbing assembly by means of two butt flanges compressing a rubber O-ring by means of an annular clamshell clamp compressed together by fasteners.

8. A secondarily contained underground piping system as claimed in claim [1] *2* wherein said interconnected chambers provide a system for collection and detection of fluids, which may originate from inside or outside the containment system.

9. A secondarily contained underground piping system as claimed in claim [1] *8* wherein said chambers have means for surface access to all of the primary piping connections, containment piping connections, flexible seal connections and chamber connections.

18. A secondarily contained underground piping system as claimed in claim [13] *15* wherein said flexible supply pipe has smooth inner and outer surfaces and is made of fiber reinforced thermal plastic composite material.

19. A secondarily contained underground piping system as claimed in claim [13] *15* wherein the flexible supply pipe couplings make a fluid tight connection to a plumbing assembly by means of two butt flanges compressing a rubber o-ring by means of an annular clamshell clamp compressed together by fasteners.

20. A secondarily contained underground piping system as claimed in claim [13] *14* wherein said interconnected chambers provide a system for collection and detection of fluids, which may originate from inside or outside the containment system.

21. A secondarily contained underground piping system as claimed in claim [13] *20* wherein said chambers have means for surface access to all of the primary piping connections, containment piping connections, flexible seal connections and chamber connections.

24. A secondarily contained underground piping system as claimed in claim [23] *14* wherein the ends of the non-flexible containment piping sections are tapered and fit inside a coupling to provide an overlap joint whereby the coupling and fitting have a slightly larger inside diameter than the outside diameter of the end portion of the non-flexible containment pipe section and a bonding adhesive between the overlap joint.

25. A secondarily contained underground piping system as claimed in claim [23] *14* including a compression coupling joining the ends of said non-flexible pipe sections including a tapered annular seal installed within the compression coupling wedged into a tapered section of the compression coupling by means of a threaded compression cuff [32].

* * * * *